Figure 1:
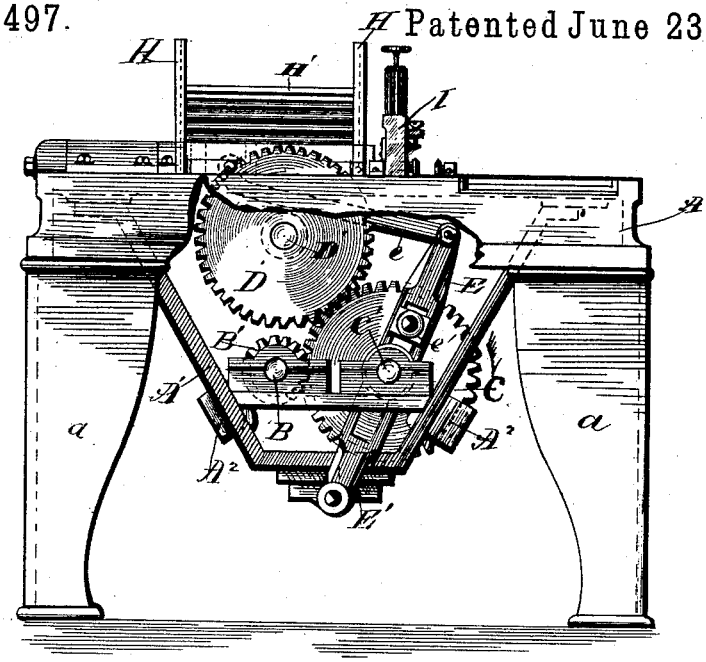

(No Model.)  7 Sheets—Sheet 1.

W. J. POSSONS.

MACHINE FOR DRESSING CARBONS.

No. 320,497. Patented June 23, 1885.

WITNESSES
Wm. M. Monroe.
Geo. W. King.

INVENTOR
by Wm. J. Possons
Leggett and Leggett, Attorneys.

(No Model.) 7 Sheets—Sheet 3.
W. J. POSSONS.
MACHINE FOR DRESSING CARBONS.
No. 320,497. Patented June 23, 1885.
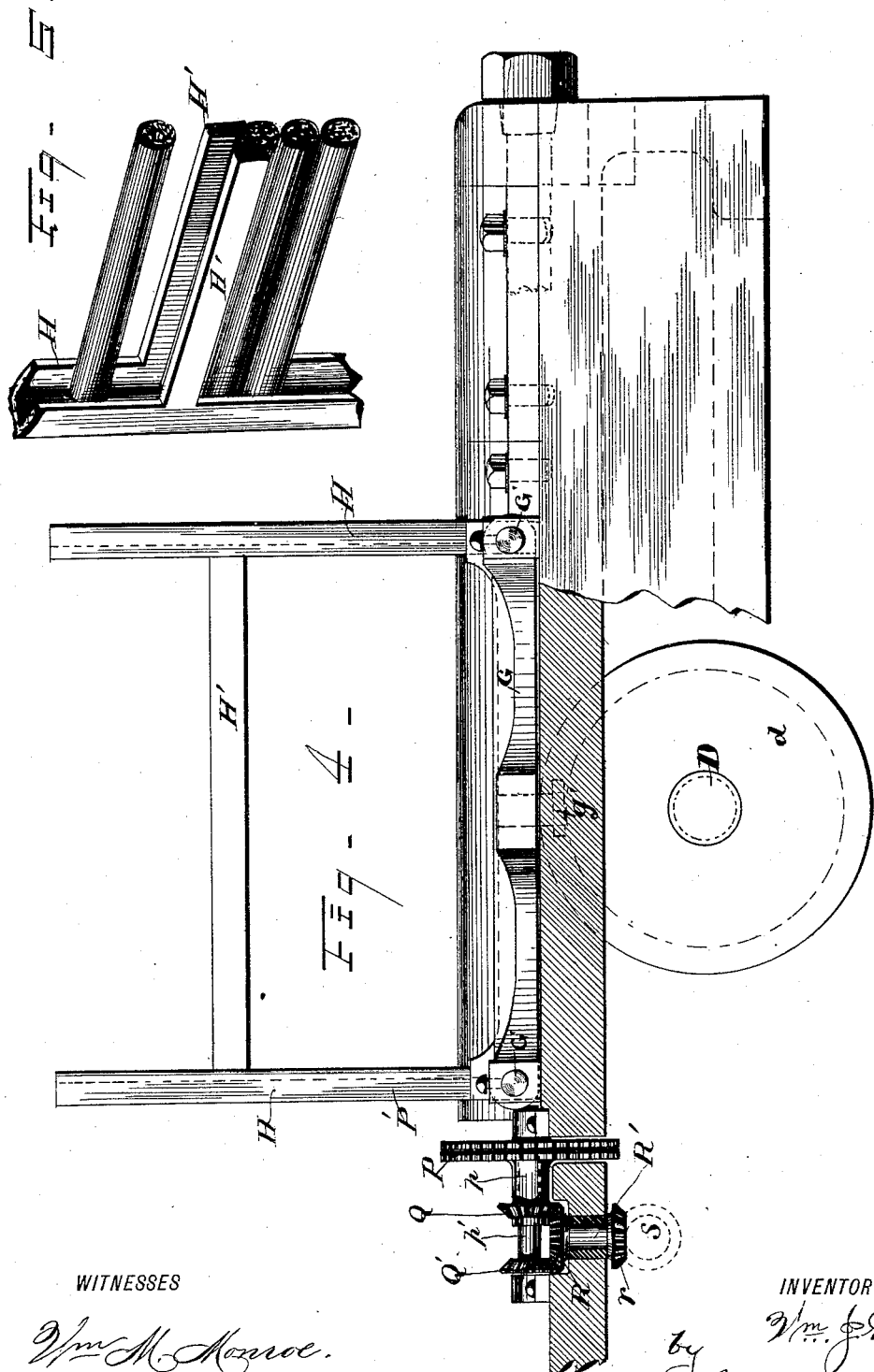

(No Model.) 7 Sheets—Sheet 4.

W. J. POSSONS.
MACHINE FOR DRESSING CARBONS.

No. 320,497. Patented June 23, 1885.

(No Model.) 7 Sheets—Sheet 5.

W. J. POSSONS.
MACHINE FOR DRESSING CARBONS.

No. 320,497. Patented June 23, 1885.

WITNESSES
Wm M Monroe
Geo W King

INVENTOR
Wm J Possons
by
Leggett & Leggett
Attorneys (No Model.) 7 Sheets—Sheet 6.

W. J. POSSONS.
MACHINE FOR DRESSING CARBONS.

No. 320,497. Patented June 23, 1885.

WITNESSES
INVENTOR
Wm. J. Possons.
by Leggett and Leggett, Attorneys (No Model.) 7 Sheets—Sheet 7.

W. J. POSSONS.
MACHINE FOR DRESSING CARBONS.

No. 320,497. Patented June 23, 1885.

WITNESSES

INVENTOR

UNITED STATES PATENT OFFICE.

WILLIAM J. POSSONS, OF CLEVELAND, OHIO.

MACHINE FOR DRESSING CARBONS.

SPECIFICATION forming part of Letters Patent No. 320,497, dated June 23, 1885.

Application filed February 26, 1884. (No model.)

*To all whom it may concern:*

Be it known that I, WILLIAM J. POSSONS, of Cleveland, in the county of Cuyahoga and State of Ohio, have invented certain new and useful Improvements in Machines for Dressing Carbons; and I do hereby declare the following to be a full, clear, and exact description of the invention, such as will enable others skilled in the art to which it pertains to make and use the same.

My invention relates to improvements in machines for dressing carbons, more especially carbons used in electric lighting.

The primary object of my invention is to provide an automatic machine that will receive the carbons in cards, and successively sever the carbons from the cards, and properly dress and discharge them from the machine.

A further object is to provide receiving-ways for the cards of carbons, and provided with gaging mechanism that will only pass carbons that are laterally of standard size and form.

A further object is to provide reciprocating knives that will at the proper time sever carbons from the card and discharge them to the machine, and at the same time hold the bottom of the card from engaging the machine.

A further object is to provide a reciprocating cross-head that will feed the severed carbons endwise through the cutters, and mechanism for so actuating the cross-head as to cause a slow feed and "quick return."

A further object is to provide two circular cutters with internal cutting-edges and acting conjointly, and mechanism timed to the movement of the cross-head for intermittently revolving the cutters in opposite directions, so that a different part of each cutter is brought in contact with each successive carbon, thereby distributing the wear equally to all parts of each cutter.

A further object is to provide suitable mechanism for adjusting the relative position of the two cutters to compensate for the wear of the same, by means of which the carbons are always dressed to standard size.

With these objects in view my invention consists in certain features of construction and in combination of parts hereinafter described, and pointed out in the claims.

Figure 2:
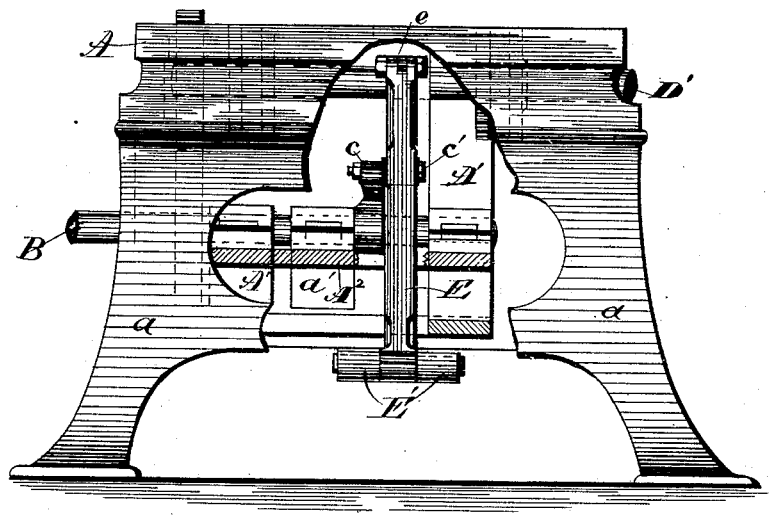
Figure 3:
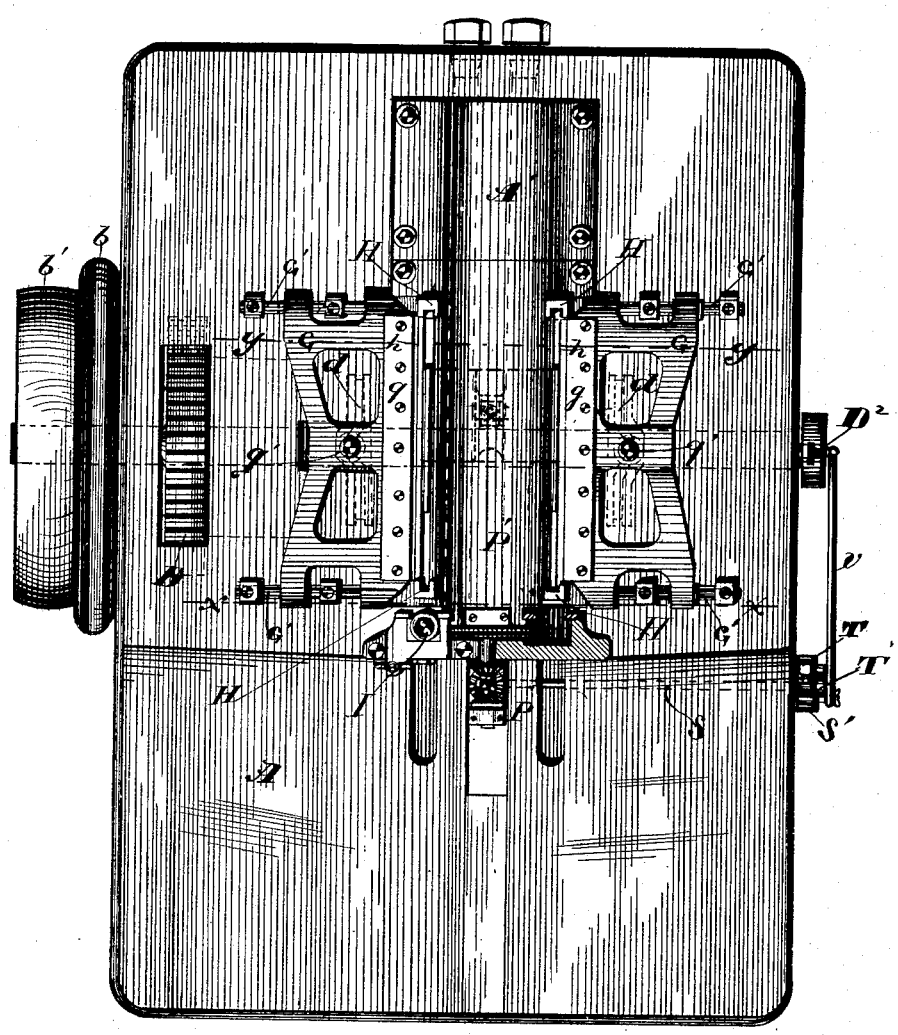
Figure 6:
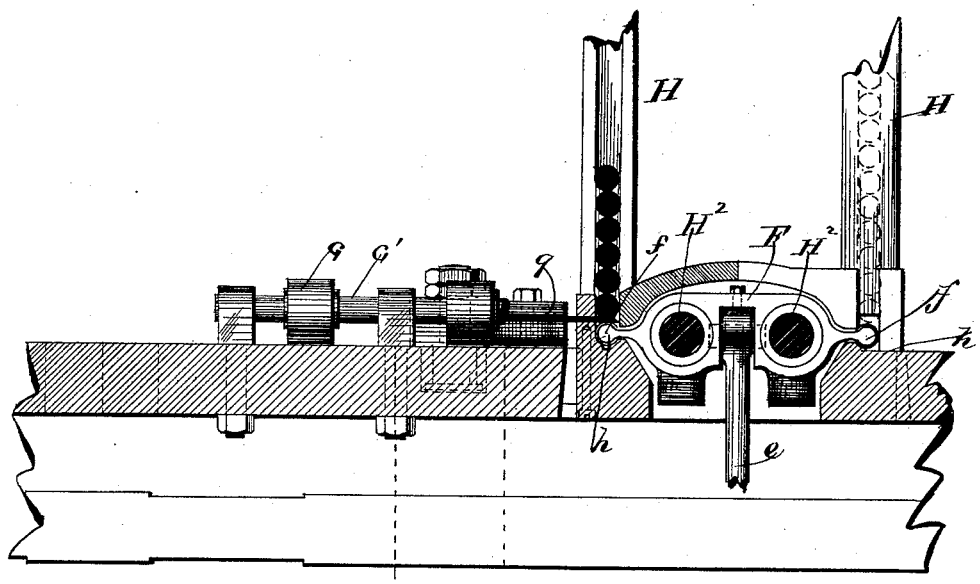
Figure 7:
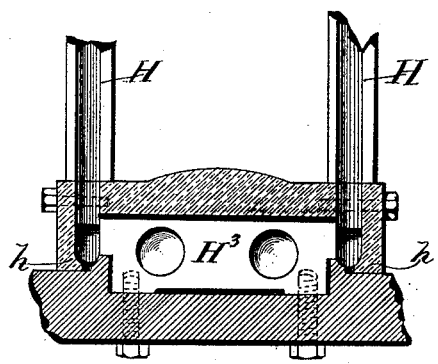
Figure 8:
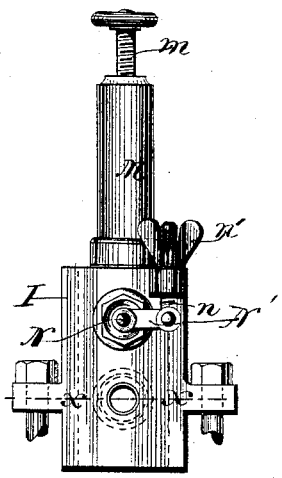
Figure 9:
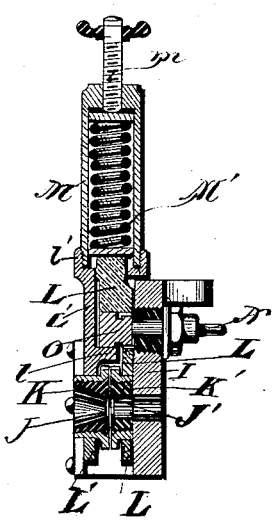
Figure 10:
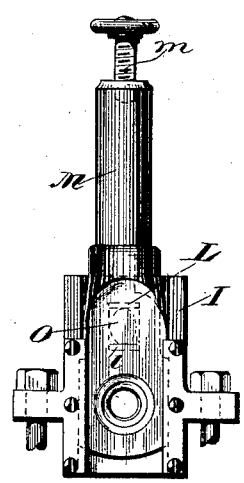
Figure 11:
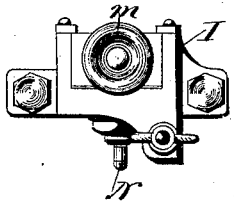
Figure 12:
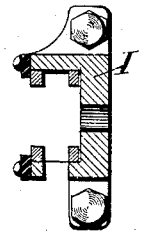
Figure 13:
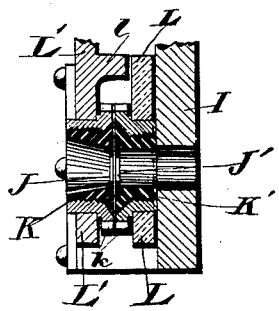
Figures 14, 15, 16, 18:
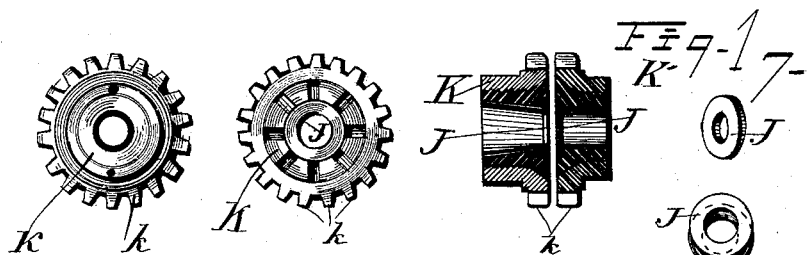
Figure 19:
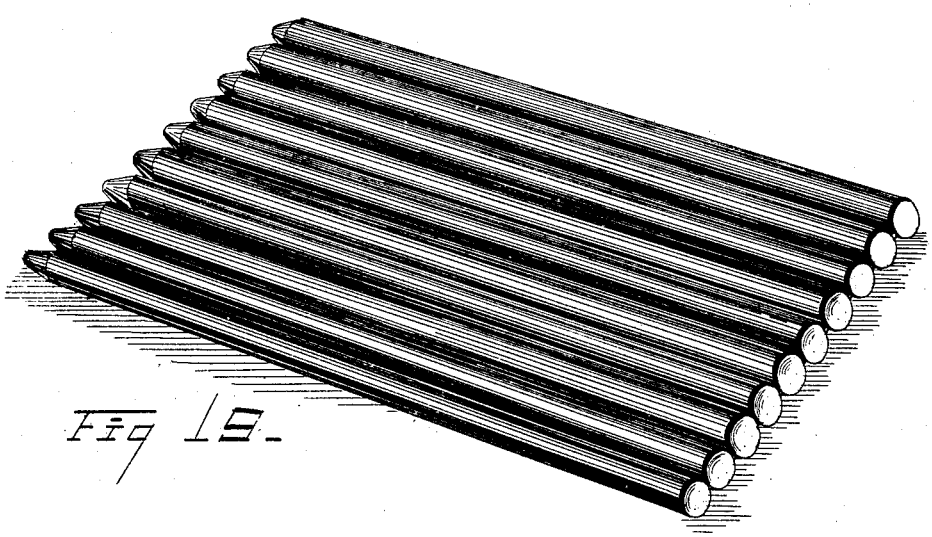
Figure 20:
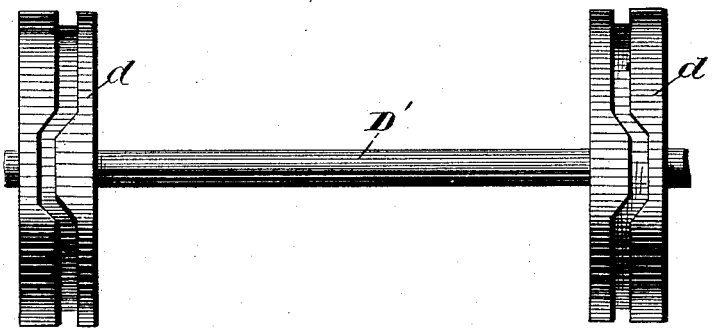
Figure 21:
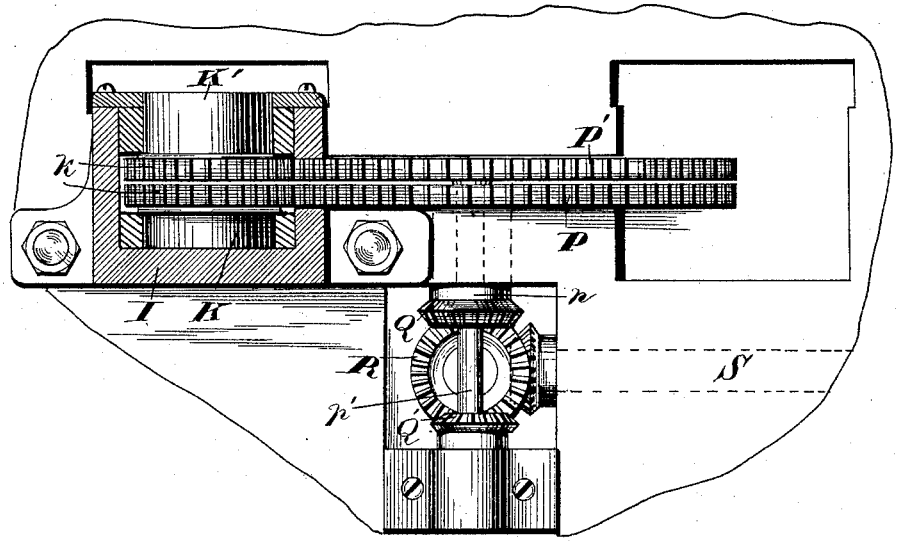

In the accompanying drawings, Figure 1 is a side elevation of my improved machine with a portion of the frame broken away to show the internal mechanism. Fig. 2 is an end elevation of the same, but with the upper part of the mechanism removed, and with a portion of the frame broken away. Fig. 3 is a plan view with the right-hand cutter-stock removed. Fig. 4 is an enlarged side elevation in detail. Fig. 5 is a view in perspective of a portion of the receiving-ways and gaging device with portions of carbons in position. Fig. 6 is a transverse vertical section in detail on the line of $x\,x$, Fig. 3, but with the left-hand vertical way removed from the fore-ground, showing in place thereof the rear way. Fig. 7 is a transverse vertical section in detail on the line of $z\,z$, Fig. 3, and in elevation the device for supporting the guides of the cross-head. Fig. 8 is a front elevation of the cutter-stock. Fig. 9 is a vertical section of the same at a right angle to the position shown in Fig. 8. Fig. 10 is a rear elevation of the same. Fig. 11 is a top view of the same. Fig. 12 is a horizontal section on the line of $x\,x$, Fig. 8, but with the internal mechanism removed. Fig. 13 is an enlarged vertical section showing the same as the lower portion of Fig. 9. Figs. 14 and 15 are elevations, respectively, of the two sides of the cutter-holder and gear with a cutter in position. Fig. 16 is a longitudinal section of a portion of the cutter-holders with the cutters in position, and showing also the relative position of the cutters and holders. Fig. 17 is a view in perspective of a cutter. Fig. 18 is a view in perspective of a pair of cutters in an eccentric position. Fig. 19 is a view in perspective of a card of carbons. Fig. 20 is a plan view of the cam-wheels $d$, and a portion of the shaft $D'$, on which the wheels are mounted. Fig. 21 is a plan view of the mechanism that revolves the cutter-holders, and on the left hand are shown the cutter-holders, and in section the cutter-stock. The stock and holders are omitted on the right hand.

A represents a supporting-table mounted on the legs $a$, and to which are attached the hangers $A'$.

$A^2$ are cross-pieces attached to the hangers and support the box $a'$.

B is the driving-shaft, provided with the pinion B′, the fly-wheel b, and the driving-pulley b′.

C and D are twin gears driven by the pinions B′, as shown. The gear C is secured to the shaft C′, the opposite end of which is journaled in the box a′ and provided with the crank c, the wrist of which has a sliding box, c′, that operates in a slot in the rock-arm E and actuates the arm. The lower end of the arm is fulcrumed in the boxes E′, while the upper end is pivotally attached to the connecting-rod e, that actuates the cross-head F. (See Fig. 6.)

The gear C, as shown in Fig. 1, moves in the direction of the arrow, and the crank when moving the arm E to the right hand operates at the upper portion of the slot and moves the arm and the attached connecting-rod and cross-head slowly, and it is this movement to the right hand that feeds the carbons to the cutters. The return movement, being made by the crank operating at the bottom portion of the slot and near the fulcrum of the arm, is rapid, so that but little time is lost during the return of the cross-head.

G are reciprocating frames that slide on the guide-rods G′, and are provided with the knives g, that sever the carbons from the cards.

H are upright ways set in pairs with the grooved sides facing each other, in which the cards of carbons are placed. A card of carbons is shown in Fig. 19. The cards are placed with their large ends toward the cutters to avoid the crumbling of the edges, which would occur at the large ends if the carbons were forced through the cutters with the pointed ends foremost. The two ways that form a pair are connected by side bars, H′, that form a gage through which can pass only such cards as are straight and of standard size. (See Fig. 5.)

The gear D is secured to the shaft D′, that extends under the table, and is provided at the other end with the adjustable crank D². This shaft is also provided with the disks d, provided on the periphery with cam-grooves the walls of which embrace, respectively, the pins g′ and actuate the frames G. These cams and cam-grooves are shown in dotted lines in Fig. 3. These grooves run in plains at right angles to the shaft, except at one part where they deflect, respectively, to the right and left, as shown.

The two frames G, by means of the pins g′ engaging these cam-grooves, are therefore held in one position while the disks make almost a revolution, and are then quickly and simultaneously drawn back in opposite directions and as quickly returned to the former position. As the knives g (attached to the frames G) are drawn back they allow the cards of carbons to drop into the horizontal ways h, (see Figs. 6 and 7,) and the return of the knives severs the lower carbon from the card, and also holds the balance of the card from dropping. This movement of the knives occurs when the cross-head is at the end of the return-stroke, so that the severed carbons are in front of the cross-head. With the forward movement of the cross-head, which immediately commences, the rear end of the severed carbons are engaged by the arms f of the cross-head, and are pushed along the ways h to the cutters. The cross-head slides on the guide-rods H², secured at each end in backs H³, one of which is shown in Fig. 7.

A′ is a cover that protects the cross-head and other parts.

I are the cutter stocks, that are secured to the table A, and by their internal mechanism hold the cutters in line with the carbons that are advanced along the horizontal ways h.

J are the cutters, and K and K′ the cutter-holders or chucks. The cutters are thin flat rings (see Fig. 17.) The chucks or cutter-holders K and K′ are similar in construction, and are journaled, respectively, in the vertically-sliding blocks L and L′. The holders have a hollow hub slotted radially at one end, as shown in Fig. 15, and have a slight annular recess at this end that receives the cutter J. The part k screws on the hub and slightly compresses the slotted end, thereby holding the cutter firmly. The part k of the holders have cogs on the periphery by which they are revolved in a manner hereinafter described.

The block L is held down by the engagement at the upper end with the spiral spring M′, the tension of which may be adjusted by the thumb-screw m.

N is a small shaft provided on the outside with the arm N′, that is pivotally attached to the screw-bolt n, that is provided with the thumb-nut n′.

The cam O is secured to this shaft, and is turned by screwing down the nut n′. The form of the cam in cross-section is shown in Fig. 10.

The block L′ is provided with a laterally-projecting lug, l, that extends under the cam O. The upper end of this block terminates in a socket, l′, into which is screwed the sleeve M, that incloses the spring, so that by the same action of the spring that presses the block L down on the cam the lug l of the block L′ is kept in contact with the bottom of the cam, and as the cam is turned the blocks L and L′ and their attached holders are moved in opposite directions, that change the cutters from a concentric to an eccentric position with each other, making the registered opening through the cutters less as the cam is turned.

The carbons are supposed to be perfect in form and of standard size, except the rough edges where they are broken from the cards, and the cutters are for removing the rough edges and the small grooves (shown in Figs. 6 and 7) at the bottom of the ways h, and to accommodate the same.

The cutters have only to dress a narrow strip along the top and bottom of the carbons. When the cutters are new, they are of the proper size, and are placed so that they register, and are concentric with each other, as aforesaid.

The two cutter-holders in each pair are made to intermittently revolve in opposite directions, so that the wear is evenly distributed. As the cutters wear they are, by means already described, arranged more or less eccentrically, so that they combine to dress the carbons as required.

The cutters in each stock and their respective holders are slightly separated, as shown in Figs. 9, 13, and 16, so as to discharge the chips or cuttings. The movement of the cutters in opposite directions facilitates the discharge of the chips and keeps them from being packed between the cutters.

The gears P and P' engage, respectively, one of the cutter-holders in each stock. The gear P' is secured to the shaft $p'$, and the gear P is secured to the sleeve $p$, that is journaled on the said shaft. The sleeve is provided with the bevel-pinion Q, and the shaft with pinion Q', that alike engage the pinion R on the shaft R'. On the lower end of this shaft is the pinion $r$, engaging an equal pinion on the horizontal shaft S. (Shown in dotted lines in Fig. 3.)

It will be seen that by the arrangement of gearing, the gears P and P' and their cutter-holders, that they respectively engage, revolve in opposite directions.

The outer end of the shaft S is provided with the ratchet-wheel S'. The oscillating lever T is fulcrumed on the end of the shaft S, and is provided with the pawl T', engaging the said ratchet-wheel.

The lever T is actuated by the connecting-rod $v$, that is attached to the aforesaid adjustable crank $D^2$. By adjusting this crank the pawl T' may be made to engage one or more notches on the ratchet-wheel S', as may be desired. By the arrangement of parts described the cutters are turned a trifle with each backward stroke of the cross-head.

As aforesaid, the carbons, after they are severed from the cards, are pushed by the cross-head along the troughs $h$ and through the cutters. The cross-head comes so near the cutters at the end of the forward stroke that only the tapering ends of the carbons are left in the cutters, and these are pushed out and discharged from the machine by the carbons that follow. The carbons are so brittle that if they were allowed to fall any considerable distance on leaving the machine many of them would be broken. A plate or board (not shown) is therefore usually arranged to receive the carbons as they are discharged from the cutters; and if the board is slightly inclined to one side the carbons will roll down the incline and out of the way. In dressing the carbons the cutters simply scrape off the rough fins or ridges that remain on the top and bottom where the carbons were severed from the cards. The carbons would be dressed just as well if passed through a single stationary cutter, but the points above and below where the scraping is done would soon be worn away. By turning the cutter a trifle with each stroke of the machine, so as to bring to bear new points of the cutting-edge, a considerable number of carbons may be dressed to the required size; but the hole in the cutter would soon be enlarged. By adding a second revolving cutter, and by means of the mechanism described for adjusting the two cutters more and more eccentrically with each other as they become worn, the cutters are made to dress a large number of carbons with accuracy. For the purpose alone of dressing or scraping the carbons, a pair of cutters might just as well turn together in the same direction; but it is found that the cutters discharge the chips more freely when turned in opposite directions. As already shown, the machine has four cutter-holders arranged in two pairs, respectively, in two cutter-stocks that stand opposite each other near the end of the machine.

For the purpose of simplifying the mechanism as much as possible, the gears P and P', that operate side by side, are of sufficient size to engage each a cutter-holder in each cutter-stock. The gear P' engages the front cutter-holders—that is, those that are on the side toward the cross-head—and the gear P engages the rear cutter-holders in each stock. These gears P and P' move in opposite directions, and consequently move the respective contiguous cutter-holders in each stock constituting a pair in opposite directions. As aforesaid, the gear P' is mounted on the shaft $p'$ and the gear P on the sleeve $p$, and the shaft has attached the bevel-gear Q', and the sleeve has attached the bevel-gear Q. These bevel gears Q and Q' engage opposite sides of the bevel-gear R, and are therefore turned in opposite directions. A single train of mechanism, as already described, for transmitting motion from the shaft D' to the gear R, is all that is required to secure the desired movements of the cutter-holders and attached cutters.

What I claim is—

1. In a machine for dressing carbons, the combination, with a receiving-way constructed and adapted to receive a card of carbons, a reciprocating knife for separating the carbons from the card, and an annular cutter for dressing the surface of the carbons, of a reciprocating cross-head for transferring the carbons to and forcing them through the annular cutter, substantially as set forth.

2. In a machine for dressing carbons, the receiving-way consisting of end pieces formed with grooves for receiving and guiding the opposite ends of a card of carbons, and transverse plates or bars located opposite and parallel to each other near the upper portion of the receiving-way, and arranged to serve as a gage to arrest the feed of a crooked or imperfect carbon-card, substantially as set forth.

3. In a machine for dressing carbons, the combination, with a receiving-way constructed with grooved end pieces for receiving and guiding a card of carbons, a reciprocating knife arranged to operate at right angles to the receiving-way and sever the carbons from the card, an annular cutter through which the carbons are forced for dressing the surface of the carbons, and a reciprocating cross-head for transferring the carbons to and forcing them through the annular cutter, of gearing and connecting mechanism, substantially as described, for retaining the knife beneath the card, to serve as a support therefor while a separated carbon is being dressed, substantially as set forth.

4. In a machine for dressing carbons, the combination, with two receiving-ways, each provided with grooved end pieces for receiving and guiding a card of carbons, reciprocating knives arranged to work at right angles to the receiving-ways, near their lower ends, and sever the carbons from the card, and annular cutters through which the carbons are forced to dress their surface, of a single reciprocating cross-head located between the receiving-ways, for transferring the carbons to and forcing them through the annular cutters, substantially as set forth.

5. In a machine for dressing carbons, the combination, with a receiving-way constructed with grooved ends for receiving and guiding a card of carbons, a reciprocating knife constructed and arranged, substantially as described, to sever the carbons from the card, and an annular cutter for dressing the surface of the carbons, of a reciprocating cross-head for transferring the several carbons from the grooved way to and through the annular cutter, and gearing and connecting devices, substantially as described, for feeding the cross-head forward at a slow rate of speed in forcing the carbons through the annular cutter and returning it quickly, substantially as set forth.

6. In a machine for dressing carbons, the combination, with two annular cutter-holders located in close proximity to each other and secured to the same head or stock, of annular cutters removably secured within the holders, said cutters each constructed and arranged to allow the carbons to be forced through them and operated upon by their inner edges, substantially as set forth.

7. In a machine for dressing carbons, the combination, with two annular cutter-holders arranged in line with each other and annular cutters removably secured within the holders, of blocks for supporting said holders, and means substantially as described for adjusting the blocks, substantially as set forth.

8. In a machine for dressing carbons, the combination, with a slitted holder and an adjusting or tightening-ring encircling the same, of an annular cutter removably secured within the holder, said cutter having an inner cutting-edge, substantially as set forth.

9. In a machine for dressing carbons, the combination, with two cutter-holders and annular cutters removably secured therein, of blocks for supporting said cutter-holders, a spring for forcing the blocks in one direction, and a cam for moving them in an opposite direction, substantially as set forth.

10. In a machine for dressing carbons, the combination, with a block having a cutter-holder supported therein and a casing having an inclosed spring connected to the block, of another block provided with a cutter-holder, a cam interposed between said blocks, and annular cutters removably secured within the holders, substantially as set forth.

11. In a machine for dressing carbons, the combination, with a cutter-holder and an annular cutter removably secured therein, said cutter constructed with a central opening, through which the carbon is forced to have its surface dressed, of gearing for imparting rotary adjustment to the cutter-holder, substantially as set forth.

12. In a machine for dressing carbons, the combination, with two cutter-holders, each having an annular cutter removably secured therein, said cutter constructed with a central opening, through which the carbon is forced for dressing its surface, of means, substantially as described, for adjusting said annular cutters eccentrically to compensate for wear, substantially as set forth.

13. In a machine for dressing carbons, the combination, with two cutter-holders located in close proximity to each other and secured to the same head or stock, and an annular cutter removably secured within each holder, of gearing on each cutter-holder, constructed and arranged substantially as described, for rotating said cutter-holders in opposite directions, substantially as set forth.

14. In a machine for dressing carbons, the combination, with two cutter-holders and annular cutters, each provided with a central opening, through which the carbons are forced for dressing, the cutters being separated to allow of the discharge of chips between them, of gearing, substantially as described, for rotating the cutters in opposite directions, substantially as set forth.

In testimony whereof I sign this specification, in the presence of two witnesses, this 16th day of February, 1884.

WILLIAM J. POSSONS.

Witnesses:
ALBERT E. LYNCH,
CHAS. H. DORER.